(12) United States Patent
Sharpe (10) Patent No.: US 12,262,666 B2
(45) Date of Patent: Apr. 1, 2025

(54) REUSABLE WREATH FRAME ASSEMBLY

(71) Applicants: CAROLINA WREATH COMPANY, Sharpsburg, NC (US); Richard T. Sharpe, Rocky Mount, NC (US)

(72) Inventor: Richard T. Sharpe, Rocky Mount, NC (US)

(*) Notice: Subject to any disclaimer, the term of this patent is extended or adjusted under 35 U.S.C. 154(b) by 96 days.

(21) Appl. No.: 17/770,507

(22) PCT Filed: Oct. 20, 2020

(86) PCT No.: PCT/US2020/056444
§ 371 (c)(1),
(2) Date: Apr. 20, 2022

(87) PCT Pub. No.: WO2021/080958
PCT Pub. Date: Apr. 29, 2021

(65) Prior Publication Data
US 2022/0377985 A1    Dec. 1, 2022

Related U.S. Application Data

(60) Provisional application No. 62/923,758, filed on Oct. 21, 2019.

(51) Int. Cl.
*A01G 5/04*    (2006.01)
*A01G 5/02*    (2006.01)

(52) U.S. Cl.
CPC    *A01G 5/04* (2013.01); *A01G 5/02* (2013.01)

(58) Field of Classification Search
CPC ................................ A01G 5/04; A01G 5/02
USPC .......................................................... 428/10
See application file for complete search history.

(56) References Cited

U.S. PATENT DOCUMENTS

| | | | |
|---|---|---|---|
| 1,478,487 A * | 12/1923 | Ross | A01G 5/04 428/17 |
| 3,308,005 A | 3/1967 | Pinnecker | |
| 3,819,458 A | 6/1974 | Kinderman et al. | |
| 5,501,889 A | 3/1996 | Church | |
| 9,357,713 B1 | 6/2016 | Sharpe | |
| 2006/0117629 A1 | 6/2006 | Errington | |

* cited by examiner

*Primary Examiner* — Katherine A Christy
(74) *Attorney, Agent, or Firm* — COATS & BENNETT, PLLC

(57) ABSTRACT

A reusable wreath frame assembly for supporting and retaining wreath material. The reusable wreath frame assembly includes a frame and a multi-link fastening assembly. The frame forms a wreath back and is configured to extend adjacent the wreath material. The multi-link fastening assembly extends from the frame. The multi-link fastening assembly is operative to assume a fastened mode and an unfastened mode. The multi-link fastening assembly secures the wreath material to the frame when in the fastened mode. When the multi-link fastening assembly is in the unfastened mode, the wreath material can be placed on the frame.

4 Claims, 9 Drawing Sheets

REUSABLE WREATH FRAME ASSEMBLY

CROSS REFERENCE TO RELATED APPLICATIONS

This application claims priority to U.S. Provisional Application No. 62/923,758, filed on Oct. 21, 2019, which is incorporated by reference herein in its entirety.

TECHNICAL FIELD

Described herein is a reusable wreath frame assembly for supporting and retaining wreath material. The reusable wreath frame assembly includes a frame and a multi-link fastening assembly. The frame forms a wreath back and is configured to extend adjacent the wreath material. The multi-link fastening assembly extends from the frame. The multi-link fastening assembly is operative to assume a fastened mode and an unfastened mode. The multi-link fastening assembly secures the wreath material to the frame when in the fastened mode. When the multi-link fastening assembly is in the unfastened mode, the wreath material can be placed on the frame.

BACKGROUND

Each year millions of people across the world flock to Christmas tree farms in search of the perfect wreath to serve as a focal point of their seasonal decorations. Wreaths of all styles are a part of Christmas traditions in many households and remain so over generations. Composed of lush greenery and articulate ribbonry these wreaths are truly a piece of artistry and skillful craftsmanship. However, each year these extravagant wreaths are merely discarded at the end of the holiday season. While the greenery and decorative ornamentation may be withered, it is unnecessary to shed the entire wreath. Disposing of millions of wreaths each year is not only wasteful but also economically inefficient for the consumer.

Wreath manufacturers often struggle to keep up with the large influx of demand for these popular wreaths during the holiday season. Most wreaths are handmade and customized to the consumer's desire, which can be a tedious process for the artisan. Constructing a symmetrical and uniform wreath for the customer can be a difficult task when given only select materials and criteria. In addition, the cost of such a wreath is often driven up based on the time and detail put into construction. Having a base frame from which to construct each wreath would not only expedite the production process but would also lead to less discarded decorations at the end of the season.

A reusable wreath frame is described in U.S. Pat. No. 9,357,713, which is incorporated by reference herein for such teachings.

There is a need for a reusable wreath framework in which occasional wreaths of all types can be manufactured having a multi-link fastening assembly that permits ease of assembly of the frame, frame adjustability, superior retention of the wreath material, a wider range of wreath material to be used, and reduced manufacturing costs.

SUMMARY

One embodiment described herein is a reusable wreath frame assembly for supporting and retaining wreath material. The reusable wreath frame assembly includes a frame, and a multi-link fastening assembly. The frame forms a wreath back and is configured to extend adjacent the wreath material. The multi-link fastening assembly extends from the frame. The multi-link fastening assembly is operative to assume a fastened mode and an unfastened mode. The multi-link fastening assembly secures the wreath material to the frame when in the fastened mode and when the multi-link assembly is in the unfastened mode, the wreath material can be placed on the frame. The multi-link fastening assembly includes a base, a lever assembly, and a catch. The base is coupleable to the frame. The lever assembly is coupled to the base. The catch is coupled to the base. Interaction between the lever assembly and the base moves the multi-link fastening assembly from the unfastened mode to the fastened mode.

Another embodiment described herein is a multi-link fastening assembly for supporting and retaining wreath material. The multi-link fastening assembly includes a base, a lever assembly, and a catch. The base includes a plurality of holes. The lever assembly is pivotally coupled to the base via one of the plurality of holes. The catch is pivotally coupled to the base via another one of the plurality of holes. Interaction between the lever assembly and the catch moves the multi-link fastening assembly from an unfastened mode, to a fastened mode. The fastened mode allows the wreath material to be held between the lever assembly and the base.

Another embodiment described herein is a base for a multi-link fastening assembly. The base includes a first housing shell, a second housing shell, a first hole, and a second hole. The second housing shell is removably coupled to the first housing shell. The first housing shell and the second housing shell are identical. The first hole is formed by the first housing shell and the second housing shell. The first hole is configured to receive a latch assembly. The second hole is formed by the first housing shell and the second housing shell. The second hole is configured to receive a frame.

Another embodiment described herein is a reusable wreath kit comprising: one or more frames that forms a wreath back and configured to extend adjacent the wreath material; one or more multi-link fastening assembly extending from the frame, the multi-link fastening assembly operative to assume a fastened mode and an unfastened mode, the multi-link fastening assembly securing the wreath material to the frame when in the fastened mode and when the multi-link fastening assembly is in the unfastened mode, the wreath material can be placed on the frame, the multi-link fastening assembly including, a base couplable to the frame, a lever assembly coupled to the base, a catch coupled to the base, and wherein interaction between the lever assembly and the catch moves the multi-link fastening assembly from the unfastened mode to the fastened mode; and optionally, natural or artificial greenery, natural or artificial flowers, bows, ribbons, or craft articles.

Another embodiment described herein is a method for assembling a wreath, the method comprising: securing wreath material comprising natural or artificial greenery, natural or artificial flowers, bows, ribbons, or craft articles to a reusable wreath frame, the reusable wreath frame assembly comprising: one or more frames that forms a wreath back and configured to extend adjacent the wreath material; and one or more multi-link fastening assembly extending from the frame, the multi-link fastening assembly operative to assume a fastened mode and an unfastened mode, the multi-link fastening assembly securing the wreath material to the frame when in the fastened mode and when the multi-link fastening assembly is in the unfastened mode, the wreath material can be placed on the frame, the multi-link fastening assembly including, a base couplable to the frame, a lever assembly coupled to the base, a catch coupled to the base, and wherein interaction between the lever assembly and the catch moves the multi-link fastening assembly from the unfastened mode to the fastened mode.

Other embodiments and aspects described herein will become apparent by consideration of the detailed description and accompanying drawings.

Before any embodiments or aspects described herein are explained in detail, it is to be understood that the embodiment and aspects described herein are not limited in their application to the details of construction and the arrangement of components set forth in the following description or illustrated in the following drawings. The apparata, assemblies, and methods are capable of other embodiments and of being practiced or of being carried out in various ways. Also, it is to be understood that the phraseology and terminology used herein is for the purpose of description and should not be regarded as limiting.

DETAILED DESCRIPTION

Figure 1:
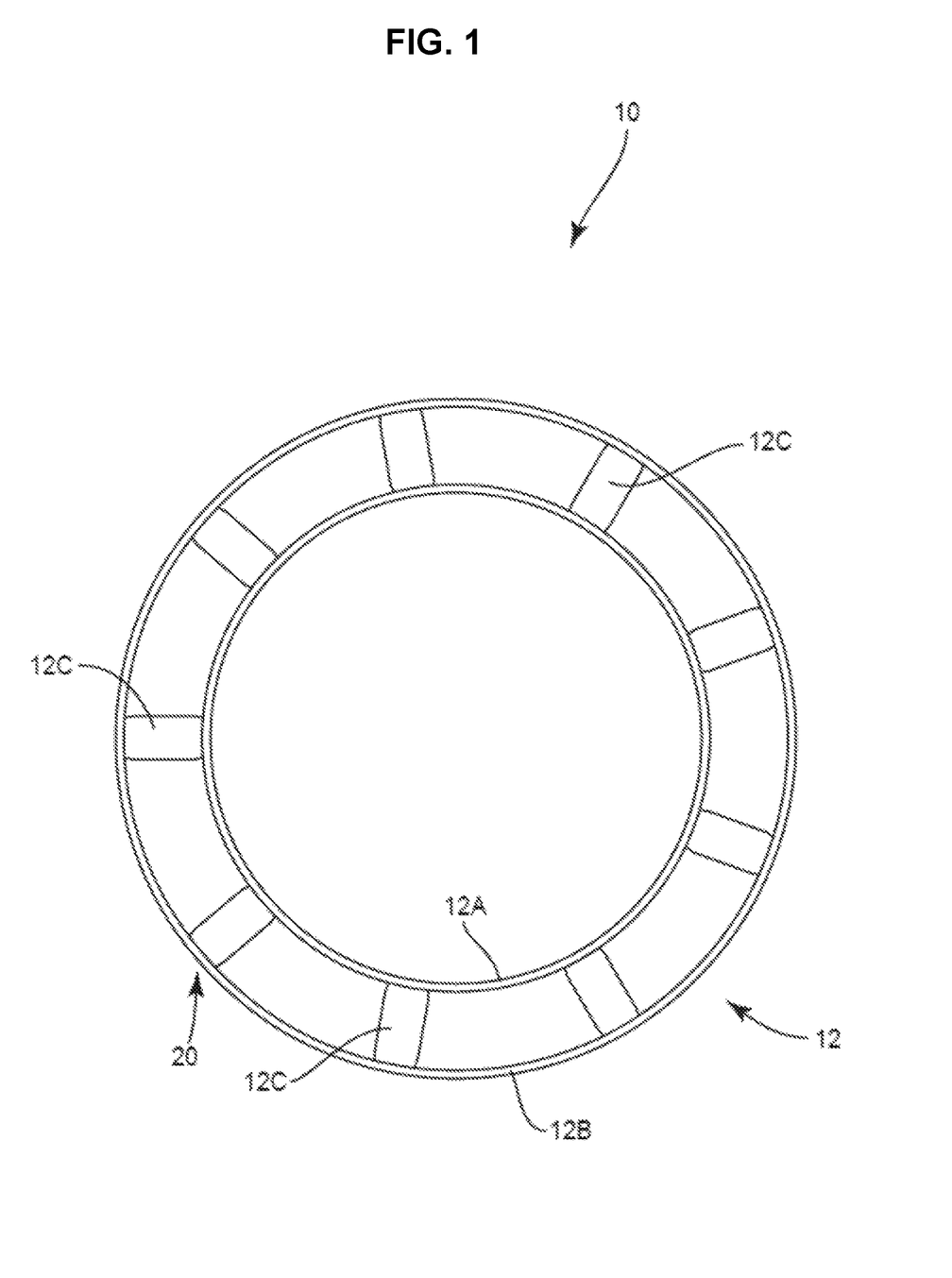
FIG. 1 is a plan view of a reusable wreath frame assembly.
Figure 2:
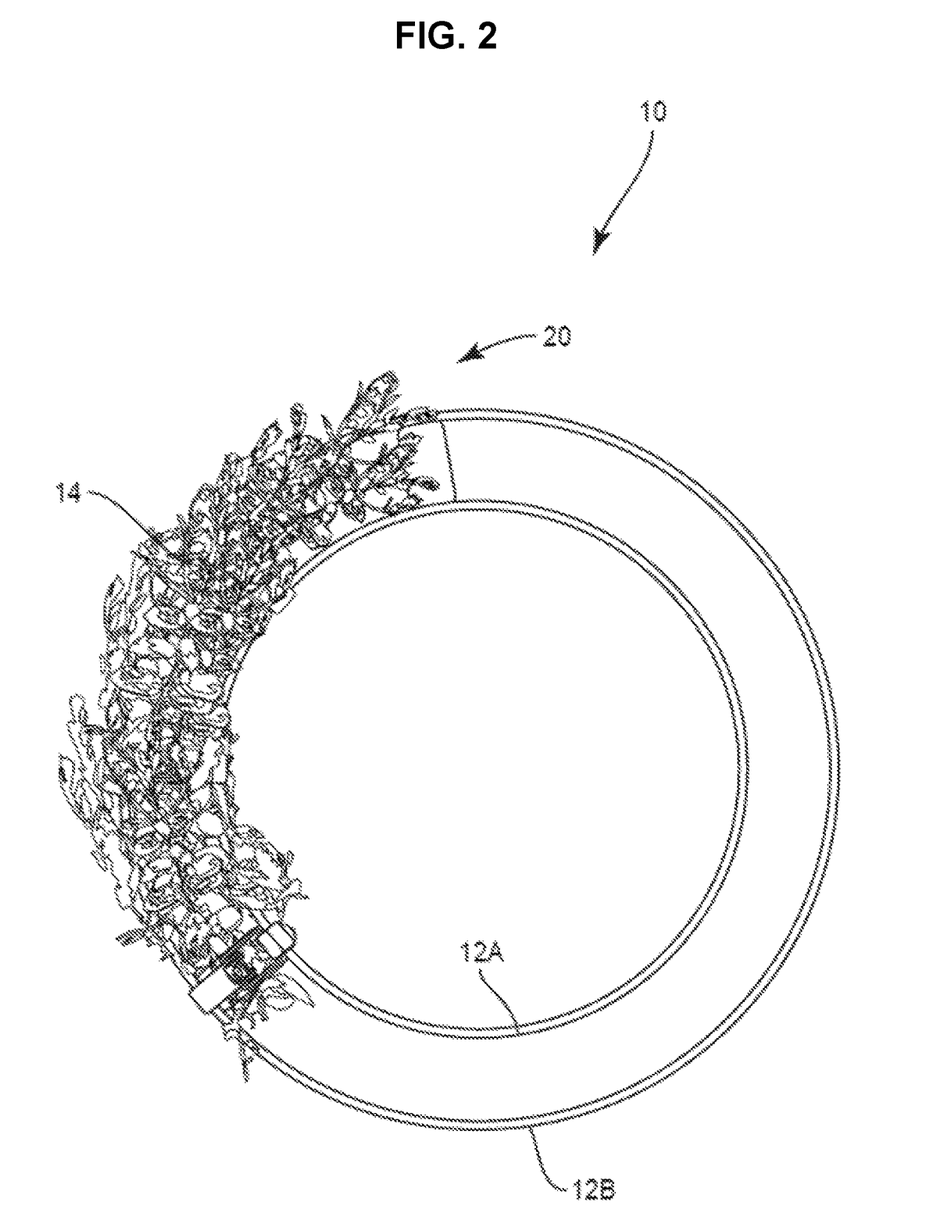
FIG. 2 is a plan view of the reusable wreath frame assembly of FIG. 1 with a wreath material.

With further reference to the drawings, particularly FIG. 1, the reusable wreath frame assembly described herein is shown therein and indicated generally by the numeral 10. The frame assembly 10 includes a frame structure 12. The frame structure 12 includes an inner member 12a, outer member 12b, and frame connectors 12c. The inner member 12c and outer member 12b are concentric and may have varying diameters. The frame connectors 12c are circumferentially spaced around the frame structure 12. Together, the inner member 12a, the outer member 12b, and the frame connectors 12c form a full circle support structure for the wreath material 14. The frame structure inner 12a and outer member 12b may optionally have detents, indentations, or protrusions to position the frame connectors 12c or prevent them from sliding or moving. The frame structure 12 can be constructed of various materials such as metal, plastic, wood, or any other suitable material. As shown in FIG. 2, the frame structure 12 serves as a foundation or support for the wreath material 14. The wreath material 14 may be composed of a variety of materials that are conventionally incorporated into wreaths. Exemplary material includes natural and artificial greenery, natural and artificial flowers, bows, ribbons, and even craft articles. It should be appreciated that the frame structure 12 discussed above and shown in the drawings is an exemplary embodiment and that other designs are envisioned. For example, the frame structure may include one or a plurality of spaced apart members and can comprise a round, square, triangular, trapezoidal, polygonal, or arcuate annular structure or, for example, could include a single curved member.

Secured to the frame structure 12 is a series of multi-link fastening assemblies 20. The multi-link fastening assembly 20 is designed to assume a fastened mode or an unfastened mode. When disposed in the fastened mode, each multi-link fastening assembly 20 extends around or wraps around a portion of wreath material 14 supported on the frame structure 12. FIG. 1 shows each multi-link fastening assembly 20 in an unfastened or open mode.

The multi-link fastening assemblies 20 provide several advantages for the wreath assembly. First, the multi-link fastening assembly 20 combines two functions—it retains the frame rings, comprises the fastening hardware, and fastens the wreath material to the frame. Second, the multi-link fastening assembly 20 permits a wide range of adjustability in forming the wreath, both in the positional arrangement around the frame, and the holding capacity of wreath material. Third, the multi-link fastening assembly 20 permits the end user to assemble the wreath. Kits comprising a plurality of multi-link fastening assemblies 20 and frame components can be provided where the end user easily assembles the reusable wreath frame assembly. The multi-link fastening assembly 20 are easily replaceable and interchangeable if one is broken or additional assemblies are required for specific wreath designs. Finally, the multi-link fastening assembly 20 reduces manufacturing and labor costs for the assembly of reusable wreath frames because the materials are inexpensive, do not require welding or tools, and can be assembled by those with little experience in the art.

Figure 3:
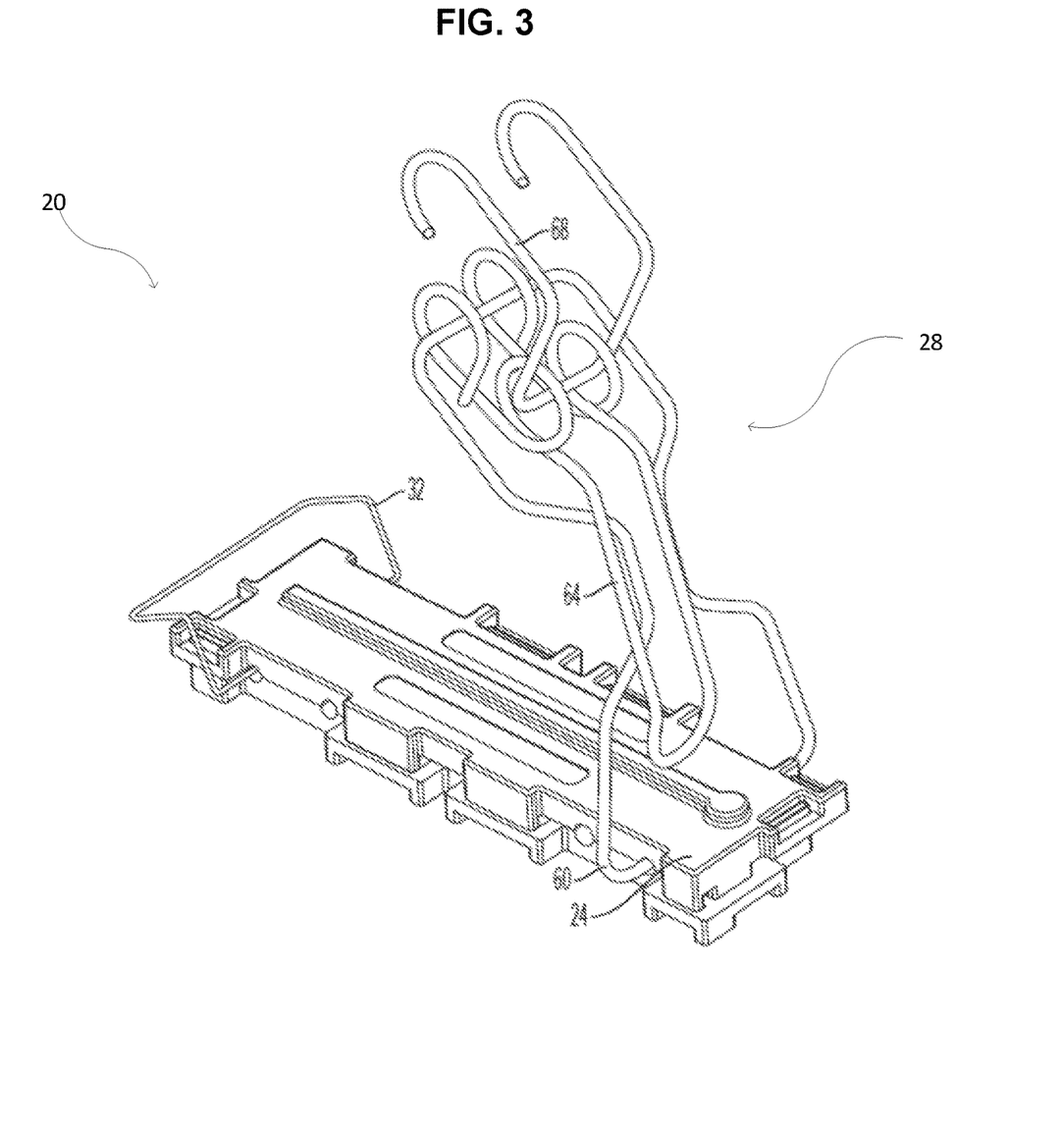
FIG. 3 is a perspective view of a multi-link fastening assembly of FIG. 1 in an unfastened mode.
Figure 4:
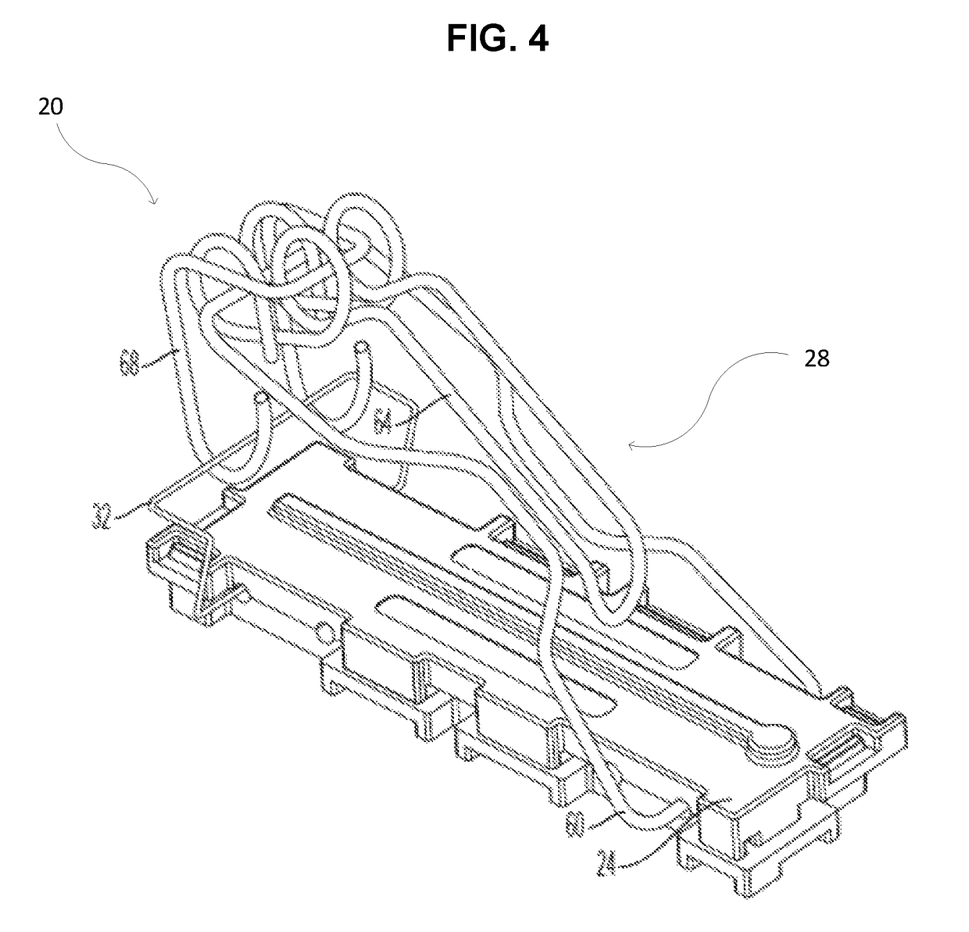
FIG. 4 is a perspective view of a multi-link fastening assembly of FIG. 1 in a fastened mode.

With reference to FIGS. 3 and 4, the multi-link fastening assembly 20 includes a series of interconnected rigid links. In one embodiment, the multi-link fastening assembly 20 includes a base 24, a lever assembly 28, and a catch 32. The lever assembly 28 and the catch 32 are pivotally connected to the base 24.

Figure 5:
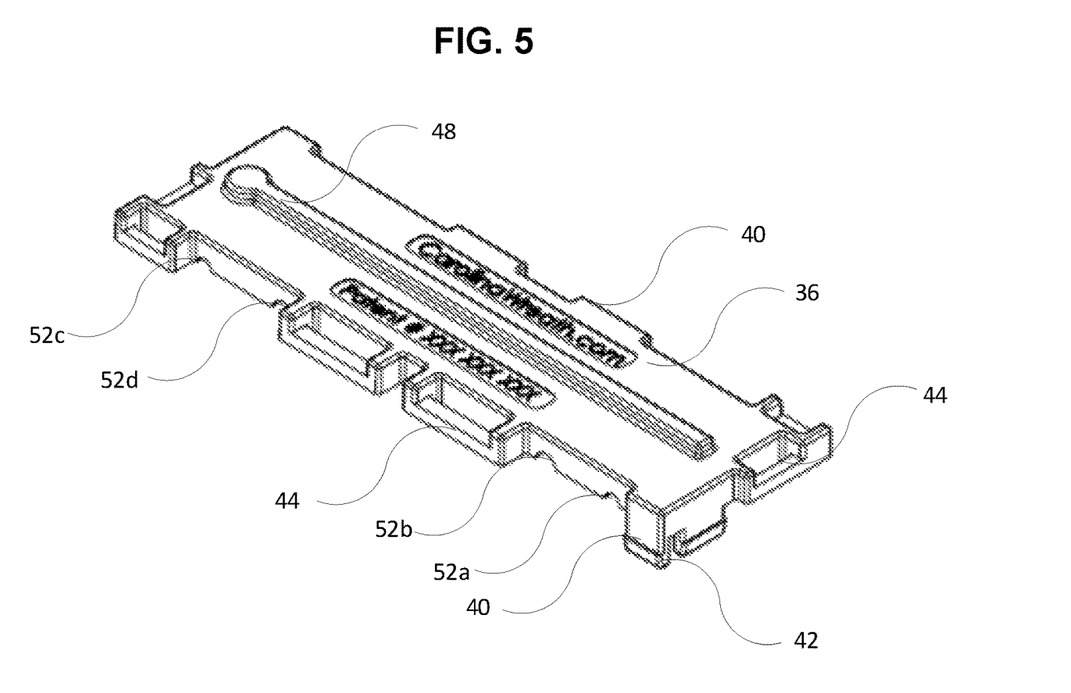
FIG. 5 is a perspective view of a housing shell of FIG. 3.

With reference to FIG. 5, the base 24 includes identical first and second housing shells 36a, b. In the depicted embodiment, the housing shell 36a, b forms a rectangular prism, although, in other embodiments, the housing shell 36a, b may form a cube, a cylinder, or the like. Protrusions 40 extend from a first side of the housing shell 36a, b. In the depicted embodiment, two protrusions 40 extend from the first side. Additionally, protrusions 40 are formed at and extend from a first corner and a third corner of the housing shell 36a, b. The third corner is opposite the first corner. In the depicted embodiment, two protrusions 40 extend from the first and third corners, respectively. In alternative embodiments, the housing shell 36a, b may include greater than, or less than, four total protrusions 40 extending from the housing shell 36a, b. The protrusions 40 are rectangular in shape, although, in additional embodiments, the protrusions 40 may be square in shape, circular in shape, hexagonal in shape, or the like. In the depicted embodiment, each protrusion includes a barb 42.

Openings 44 are formed on a second side of the housing shell 36a, b. The second side is opposite the first side. In the depicted embodiment, two openings 44 are formed on the second side. Additionally, openings 44 are formed at and extend from a second corner and a fourth corner. The second corner is disposed adjacent the first corner, and the fourth corner is disposed adjacent the third corner. In other words, the corners alternate whether the corner includes the protrusions 40 or the openings 44. In the depicted embodiment, two openings 44 extend from the second and fourth corners, respectively. The openings 44 are sized to receive the protrusions 40. In other words, the openings 44 are square in shape.

The first and second housing shells 36*a, b* may be coupled by inserting the protrusions 40 of one of the housing shells 36*a, b* into the openings 44 of the alternate housing shell 36*a, b*. A decal 48 may be included on an outside surface of each of the housing shells 36*a, b* such that the user is able to locate the orientation in which the protrusions 40 may be inserted into the openings 44. In additional embodiments, the housing shells 36*a, b* may not include decals 48. Once the housing shells 36*a, b* are properly aligned to allow insertion of the protrusions 40 into the openings 44, forces are imparted onto the housing shells 36*a, b* such that the housing shells 36*a, b* are pushed together, thereby inserting the protrusions 40 into the openings 44. Once the protrusions 40 have been inserted into the openings 44, the barbs 42 engage with a surface surrounding the openings 44. This engagement prevents the protrusions 40 from unintentionally dislodging from the openings 44. To uncouple the housing shells 36*a, b*, reciprocating forces are imparted onto the respective housing shells 36*a, b*, thereby pulling the housing shells 36*a, b* apart. The reciprocating forces overcome the force between the barbs 42 and the openings 44 such that the protrusions 40 dislodge from the openings 44.

In additional embodiments, the first and second housing shells 36*a, b* may be coupled by alternative mechanism such as fasteners, adhesive, or the like. In other embodiments, the first and second housing shells 36*a, b* may be molded together during manufacturing.

When the first and second housing shells 36*a, b* are coupled, holes 52 are formed at an interface between the first and second housing shells 36*a, b*. The holes 52 extend from the first side to the second side of the housing shells 36*a, b*. The holes 52 include first and second holes 52*a, b* positioned on a first side of the protrusions 40 and openings 44, and third and fourth holes 52*c, d* positioned on a second side of the protrusions 40 and openings 44. In other words, the protrusions 40 and openings 44 separate the first and second holes 52*a, b* from the third and fourth holes 52*c, d*. The first hole 52*a* is closer in proximity to a top side of the housing shells 36*a, b* than that of the second hole 52*b*. The first hole 52*a* includes a center divider 56 that cuts the first hole 52*a* into two separate components. The center divider 56 inhibits an object from travelling from the first side to the second side via the first hole 52*a*. The second hole 52*b* allows the object to pass from the first side to the second side via the second hole 52*b*. In some embodiments, the second hole 52*b* may be curved such that a middle of the second hole 52*b* is closer to the top side than the second hole 52*b* at the first and second sides. In other embodiments, the second hole 52*b* may not include any curvature. The third hole 52*c* is closer in proximity to a bottom side of the housing shells 36*a, b* than that of the fourth hole 52*d*. The third hole 52*c* is identical to the first hole 52*a*. The fourth hole 52*d* is identical to the second hole 52*b*. The holes 52 include circular cross-sectional shapes, although, in additional embodiments, the cross-sectional shapes may be rectangular, hexagonal, or the like. Additionally, or alternatively, each hole 52 may have a different cross-sectional shape.

Figure 6:
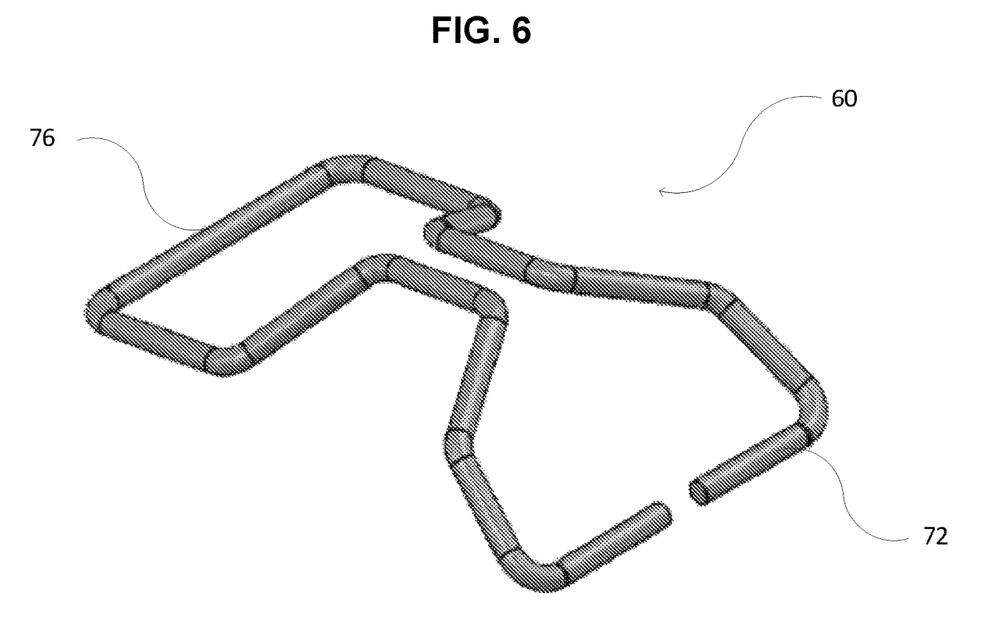
FIG. 6 is a perspective view of a whale of FIG. 3.

With reference to FIG. 6, the lever assembly 28 is couplable to either the first or the third holes 52*a, c* of the base 24. The lever assembly 28 may communicate with the catch 32 such that the multi-link fastening assembly 20 is in the fastened mode. The lever assembly 28 includes a "whale" 60, a handle 64, and a reach 68. The whale 60 is formed from a singular wire (and is so called base on its shape resembling a whale). A first end 72 of the whale 60 defines first and second ends of the wire. The ends of the wire are coaxial. A second end 76 of the whale 60 forms a portion that is parallel with the first end 72 of the whale 60. Intermediate the first and second end 72, 76, a width of the whale 60 is reduced. This reduction in width distinguishes the first end 72 from the second end 76. The whale 60 is curved such that the first and second ends 72, 76 are coplanar while the width reduction is offset. The first end 72 of the whale 60 may be coupled to the first or third hole 52*a, c* such that the second end 76 extends from the base 24.

Figure 7:
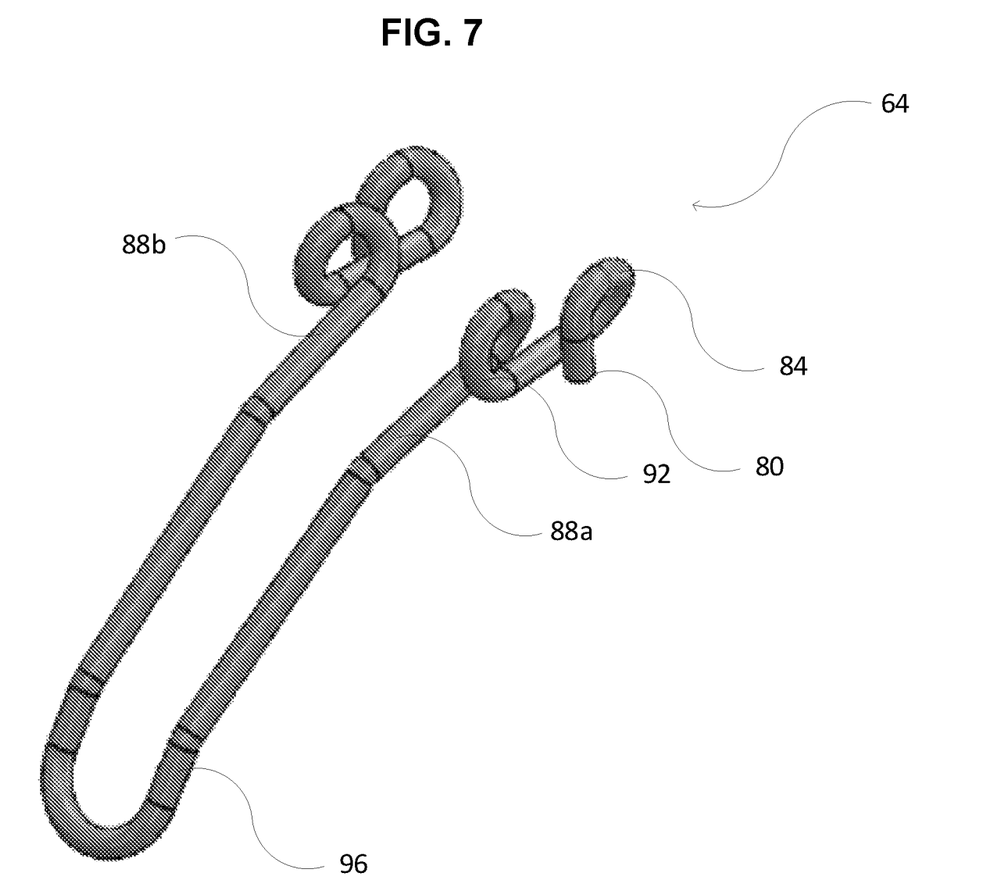
FIG. 7 is a perspective view of a handle of FIG. 3.

With reference to FIG. 7, the handle 64 may be coupled to the second end 76 of the whale 60. The handle 64 is formed from a singular wire. A first end 80 of the handle 64 defines first and second ends of the wire. The first and second ends of the wire are parallel, but not coaxial. Proximate the first end 80, first loops 84 are formed on a first handle side 88*a* and a second handle side 88*b*, respectively. Proximate the first loops 84, second loops 92 are formed on the first and second handle sides 88*a, b*, respectively. A second end 96 of the handle 64 defines a handle portion 96. The first loops 84 may couple to the second end 76 of the whale 60 such that the handle portion 96 extends from and is rotatable relative to the whale 60. The second loops 92 may couple to the reach 68.

Figure 8:
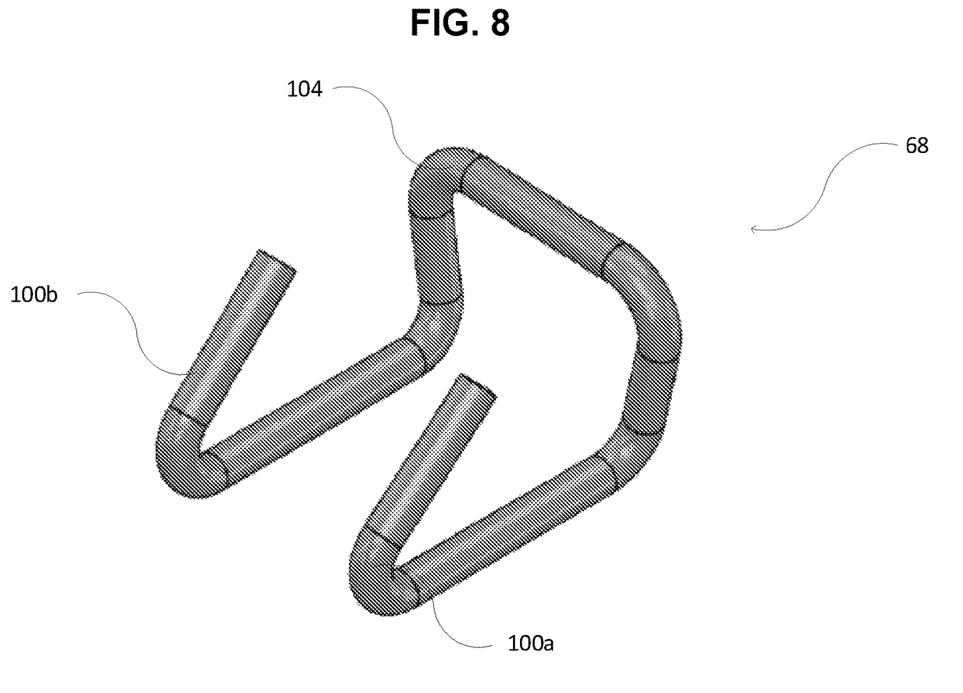
FIG. 8 is a perspective view of a reach of FIG. 3.

With reference to FIG. 8, the reach 68 is formed from a singular wire. The reach 68 includes a first angled arm 100*a*, a second angled arm 100*b*, and a loop portion 104. The first and second angled arms 100*a, b* define first and second ends of the wire, respectively. The loop portion 104 may be coupled to the second loops 92 of the handle 64. When coupled, the arms 100*a, b*, extend from the handle 64.

Figure 9:
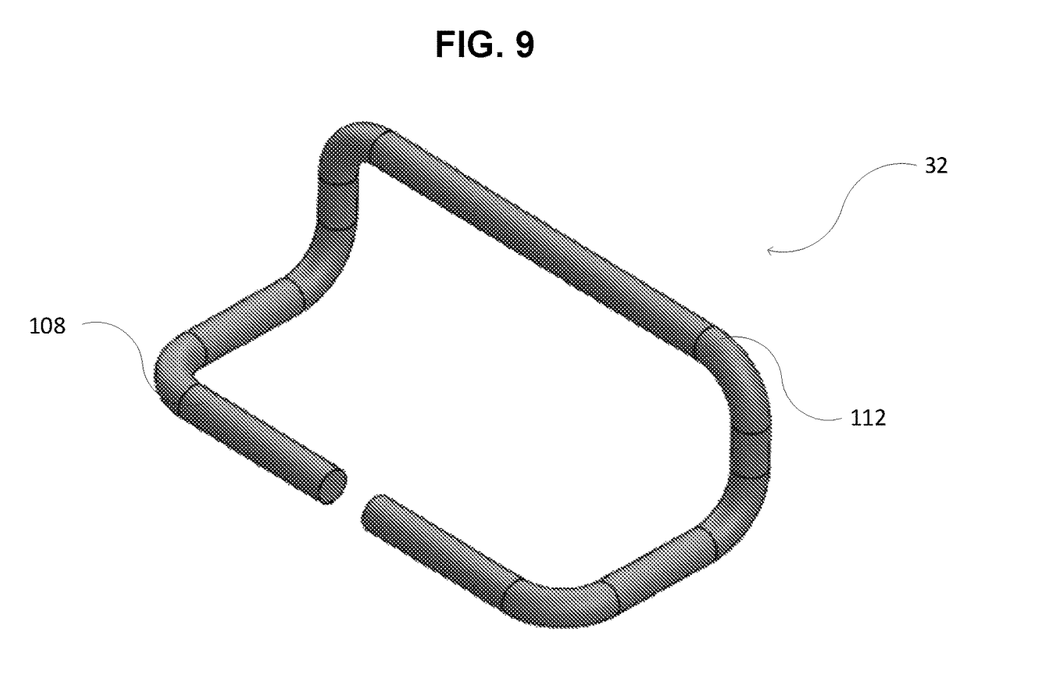
FIG. 9 is a perspective view of a catch of FIG. 3.

With reference to FIG. 9, the catch 32 may engage with the reach 68 to secure the wreath to the base 24. The catch 32 is formed from a singular wire. First and second ends of the singular wire form a first end 108 of the catch 32. The first and second ends of the wire are coaxial. A second end 112 of the catch 32 forms a closed loop. The second end 112 of the catch 32 is angled relative to the first end 108 of the catch 32. The first end 108 of the catch 32 may be coupled to the first or third hole 52*a, c* of the base 24. In this position, the reach 68 may interact with the catch 32.

The lever assembly 28 may be assembled during manufacturing. In alternative embodiments, the wires of the lever assembly 28 may be malleable such that a user may assemble the lever assembly 28.

With renewed reference to FIGS. 4 and 5, to couple the catch 32 and the multi-link fastening assembly 20 to the base 24, the first and second housing shells 36*a, b* are separated. Subsequently, the first end 108 of the catch 32 is disposed in either the first hole or the third hole 52*a, c*. The center divider 56 corresponds to a distance between the first and second ends of the wire. The center divider 56 inhibits axial movement of the first end 108 of the catch 32. Thereafter, the first end 72 of the whale 60 is inserted into the alternate of the first or the third hole 52*a, c*. Similar to the catch 32, the center divider 56 prevents axial movement of the first end 72 of the whale 60. The first and second housing shells 36*a, b* may then be coupled, such that the protrusions 40 of one of the housing shells 36*a, b* are inserted into the openings 44 of the other one of the housing shells 36*a, b*. In this position, the catch 32 and the whale 60 are secured in the first and third holes 52*a, c*. Removal of the catch 32 and the whale 60 from the holes 52*a, c* is inhibited without first removing one of the housing shells 36*a, b*.

To couple the multi-link fastening assembly 20 to the inner and outer members 12*a, b*, the first and second housing shells 36*a, b* are separated. Subsequently, the inner and outer members 12*a, b*, are disposed in the second and fourth holes 52*b, d* of the base 24, respectively. The first and second housing shells 36a, b may then be coupled, such that the protrusions 40 of one of the housing shells 36a, b are inserted into the openings 44 of the other one of the housing shells 36a, b. In this position, the base 24 is secured to the inner and outer members 12a, b. Therefore, the multi-link fastening assembly 20 may couple wreath material 14 to the inner and outer member 12a, b.

After the multi-link fastening assembly 20 has been secured to the inner and outer members 12a, b, the multi-link fastening assembly 20 may be moved from the unfastened mode to the fastened mode. To move the multi-link fastening assembly 20 from the unfastened mode to the fastened mode, the wreath material 14 is disposed on the base 24, between the catch 32 and the lever assembly 28. Thereafter, the whale 60 is pivoted about the first end 72 of the whale 60. The whale 60 is pivoted such that the second end 76 of the whale 60 moves toward the base 24. The handle 64 is then pivoted relative to the whale 60 about the first loop 84. The handle 64 is pivoted such that the handle portion 96 moves away from the whale 60. In this position, the reach 68 may pivot relative to the handle 64 such that the angled arms 100a, b of the reach 68 engage with the catch 32. Once the angled arms 100a, b, are engaged with the catch 32, the handle 64 is pivoted about the first loop 84 in a reciprocating direction. In this position, the wreath material 14 is secured to the multi-link fastening assembly 20 and the multi-link fastening assembly 20 is now in the fastened position.

In one embodiment, the assembly described herein can be used to construct wreathes of all types. In one aspect, a method for constructing a wreath comprises: gathering and consolidating wreath material into bunches and securing it to the reusable wreath frame. This process is iteratively performed until the entire wreath is constructed. For example, a first bunch of material is secured, and the process is repeated in a clockwise or counterclockwise manner so that each successive bunch overlaps the preceeding bunch until the entire circumference is covered. As described above, the specific wreath material employed can comprise various types of material (artificial or non-artificial). The size of the individual bunches can vary. They can vary in length and effective diameter. Typically, the bunches are sized to be secured on the frame structure such that a single bunch is retained by one or two fasteners. One of the advantages of the reusable wreath frame assembly described herein lies in its flexibility. Note that each end of the multi-link fastening assembly 20 is movably connected to the frame structure 12. This allows the various rigid links that comprise the assembly to be manipulated and adjusted around the bunch of wreath material 14 being secured to the frame structure 12. This greatly facilitates the adjustment and closure of the fastening assembly 20. In addition, all of the individual links, in the embodiment shown herein, are movably connected to adjacent links. This too facilitates the manipulation and placement of the links around the wreath material prior to completing the fastening arrangement. Detents, protrusions, indentations, or catches can be employed on the frame structure to position, secure, or prevent the unintentional movement of the multi-link fastening assemblies 20 around the frame structures 12.

The wreath frame assembly 10 makes constructing a wreath elementary and allows consumers to create unique wreaths using a plethora of materials that can be shaped and secured within the wreath frame structure. This reusable wreath frame assembly 10 is not only economical and environmentally friendly, but it also allows for and encourages creativity on the part of consumers. That is, while the reusable wreath frame assembly can be decorated with wreath material by a professional wreath maker, it encourages typical consumers to try their hand at creating a wreath by bunching wreath material together and securing it within the various fasteners that are mounted around the frame structure. Aside from encouraging creativity, the assembly described herein provides an economical frame structure for a wreath that can be reused time after time. Over time, the assembly described herein will reduce the cost of wreaths because the basic frame structure can easily be reused.

Finally, the reusable wreath frame assembly described herein has the advantage of being easy to use. The fasteners 20 are not complicated and are easy to manipulate by hand. Moreover, the fasteners are of the type that do not require precision in assembling the wreath material. The fasteners are flexible inasmuch as they are designed to encompass and retain bunches of wreath material of varying sizes.

It will be appreciated by those skilled in the art that the structures and mechanisms shown in the drawings and described herein are exemplary embodiments for the reusable wreath frame. Both the frame structure 12 and the multi-link fastening assembly 20 can vary in design. That is, the frame structure 12 can be constructed in various ways using various materials. The same holds true for the multi-link fastening assembly 20. Various interconnective link designs can be employed to form a fastening assembly for engaging and retaining the wreath material 14 about the frame structure 12.

It will be apparent to one of ordinary skill in the relevant art that suitable modifications and adaptations to the apparata, assemblies, methods, processes, and applications described herein can be made without departing from the scope of any embodiments or aspects thereof. The apparata, assemblies, and methods provided are exemplary and are not intended to limit the scope of any of the disclosed embodiments. All the various embodiments, aspects, and options disclosed herein can be combined in any variations or iterations. The scope of the apparata, assemblies, methods, and processes described herein include all actual or potential combinations of embodiments, aspects, options, examples, and preferences described herein. The apparata, assemblies, and methods or methods described herein may omit any component or step, substitute any component or step disclosed herein, or include any component or step disclosed elsewhere herein. Should the meaning of any terms in any of the patents or publications incorporated by reference conflict with the meaning of the terms used in this disclosure, the meanings of the terms or phrases in this disclosure are controlling. All patents and publications cited herein are incorporated by reference herein for the specific teachings thereof.

What is claimed is:

1. A reusable wreath frame assembly for supporting and retaining wreath material, the reusable wreath frame assembly comprising:
   a frame that forms a wreath back and configured to extend adjacent the wreath material;
   a multi-link fastening assembly connected to the frame and
      operative to assume a fastened mode and an unfastened mode, the multi-link fastening assembly including:
      i. a base secured to said frame, the base including first and second separable housings and wherein the frame extends through the first and second housings such that the frame is sandwiched between the first and second housings;
      ii. a lever assembly connected to the base and including a first member that is pivotally connected to a first end portion of the base, a handle movably connected to said first member, and a reach movably connected to said handle;

iii. a catch pivotally connected to a second end portion of the base and configured to engage and connect to said reach of said lever assembly; and iv. wherein leaf material supported on the reusable wreath frame assembly is held between the base and the lever assembly and the catch.

2. The reusable wreath frame assembly of claim 1, wherein the catch interacts with the reach of the lever assembly to move the multi-link fastening assembly from the unfastened mode to the fastened mode.

3. The reusable wreath frame assembly of claim 1, wherein the base includes a plurality of holes.

4. The reusable wreath frame assembly of claim 3, wherein the catch is disposed in one of the plurality of holes, and wherein the lever assembly is disposed in another one of the plurality of holes.

\* \* \* \* \*